US005478060A

United States Patent [19]

Sugimoto et al.

[11] Patent Number: 5,478,060

[45] Date of Patent: Dec. 26, 1995

[54] GUIDE JIG FOR WIRING HARNESS ASSEMBLY PLATE

[75] Inventors: Katsutoshi Sugimoto; Satoru Nishiwaki, both of Yokkaichi, Japan

[73] Assignee: Sumitomo Wiring Systems, Ltd., Japan

[21] Appl. No.: 243,990

[22] Filed: May 17, 1994

[30] Foreign Application Priority Data

May 19, 1993 [JP] Japan .................................... 5-141470

[51] Int. Cl.[6] ........................................ B23Q 3/00

[52] U.S. Cl. .............................. 269/296; 269/66; 269/74; 269/310

[58] Field of Search .............................. 269/45, 903, 296, 269/66, 74, 309, 310, 71

[56] References Cited

U.S. PATENT DOCUMENTS

| | | | |
|---|---|---|---|
| 4,953,838 | 9/1990 | Peters | 269/45 |
| 5,168,904 | 12/1992 | Quinkert . | |
| 5,215,297 | 6/1993 | Sato et al. | 269/66 |

FOREIGN PATENT DOCUMENTS

| | | |
|---|---|---|
| 178227 | 11/1983 | Japan . |
| 99313 | 8/1992 | Japan . |
| 2246087 | 1/1992 | United Kingdom . |

*Primary Examiner*—Robert C. Watson
*Attorney, Agent, or Firm*—Jordan B. Bierman; Bierman and Muserlian

[57] ABSTRACT

A guide jig (1) for a wiring harness assembly plate comprises a support tube (3) mounted and fixed on a plate member (2), and an electric wire guide rod (4) having an electric wire guide portion (4*c*) for guiding a bundle of electric wires (15) and supported by the support tube (3) for extension and retraction along the axis thereof. The support tube (3) and the electric wire guide rod (4) are supported non-rotatably on their axes relative to each other. The electric wire guide rod (4) is operable to change the positions thereof between a guide extended position in which the electric wire guide portion (4*c*) guides and holds the bundle of electric wires (15) and a guide retracted position in which the electric wire guide portion (4*c*) is retracted to a level lower than the height of the bundle of electric wires (15) being laid. In the guide retracted position, the electric wire guide rod (4) is supported by the support tube (3) such that the upper guide rod (4*a*) including the electric wire guide portion (4*c*) is reclinable with respect to the horizontal axes (L, M). The guide jig (1) provides increased working efficiency in wiring harness assembling operation.

11 Claims, 7 Drawing Sheets

GUIDE JIG FOR WIRING HARNESS ASSEMBLY PLATE

BACKGROUND OF THE INVENTION

1. Field of the Invention

The present invention relates to a guide jig for a wiring harness assembly plate which is used in assembling a wiring harness.

2. Description of the Prior Art

A wiring harness assembly plate is constructed such that a plurality of guide jigs are arranged in predetermined positions on a plate member on which wiring is suitably drawn. A plurality of electric wires measured and cut to length are laid along the corresponding guide jigs in accordance with the wiring drawing to form a branch-shaped bundle of electric wires depending on the purposes. The bundle of electric wires are wound with tape or the like so as not to be loosened. Finally, clamps, protectors and the like are mounted to the bundle of electric wires as required to accomplish a desired wiring harness.

Recently, the branch configuration of the wiring harness has been more complicated and, accordingly, the guide jigs on the assembly plate have been increased in number and in density. The guide jigs have prevented the tape winding and mounting of the clamps, protectors and the like (hereinafter referred to as an attachment mounting operation) and greatly deteriorated working efficiency.

There has been provided guide jigs for increasing the working efficiency as disclosed in Japanese Utility Model Publication No. 62-20103 (1987), Japanese Utility Model Application Laid-Open No. 4-99313 (1992), and Japanese Utility Model Application Laid-Open No. 4-33212 (1992). In the guide jigs disclosed in Japanese Utility Model Publication No. 62-20103 and Japanese Utility Model Application Laid-Open No. 4-99313, an electric wire guide rod having in its upper part a generally U-shaped electric wire guide portion for guiding a bundle of electric wires is adapted to vertically move up and down. The electric wires are laid as desired in a guide extended position in which the electric wire guide rod rises. In the attachment mounting operation, the electric wire guide rod is lowered into a guide retracted position in which the electric wire guide portion is retracted to a level lower than the height of the laid bundle of electric wires. The working efficiency has been increased in this manner in the attachment mounting operation.

In the guide jig disclosed in Japanese Utility Model Application Laid-Open No. 4-33212, a fork portion for guiding a bundle of electric wires has a reclinable electric wire hooking portion. The electric wires are laid as desired in an upstanding position of the electric wire hooking portion. In the attachment mounting operation, the electric wire hooking portion is made to assume a reclined position. The working efficiency has been increased in this manner in the attachment mounting operation.

It is however difficult to ensure a wide spacing between the electric wire guide portion of the electric wire guide rod in the guide retracted position and the laid bundle of electric wires in the guide jigs disclosed in Japanese Utility Model Publication No. 62-20103 and Japanese Utility Model Application Laid-Open No. 4-99313. In the guide jig disclosed in Japanese Utility Model Application Laid-Open No. 4-33212, there is little spacing between a horizontal rod portion of the fork portion and the laid bundle of electric wires. The electric wire guide portion and the fork portion have been obstacles, and the prior art guide jigs have been still disadvantageous in terms of working efficiency during the attachment mounting operation.

SUMMARY OF THE INVENTION

The present invention is intended for a guide jig for a wiring harness assembly plate mounted and fixed on a plate member for guiding a bundle of electric wires. According to the present invention, the guide jig comprises: a support tube mounted and fixed on the plate member; and an electric wire guide rod including an electric wire guide portion at its top end for guiding the bundle of electric wires, the electric wire guide rod being supported by the support tube for axial extension and retraction therethrough and being supported non-rotatably on the axis by the support tube, the electric wire guide rod being operable to change the positions thereof between a guide extended position in which the electric wire guide rod projects upwardly so that the electric wire guide portion guides and holds the bundle of electric wires and a guide retracted position in which the electric wire guide portion is retracted to a level lower than the height of the bundle of electric wires being laid, the electric wire guide rod in the guide retracted position being supported by the support tube such that an upper portion of the electric wire guide rod including the electric wire guide portion is reclinable with respect to a first horizontal axis.

According to the guide jig of the present invention, the electric wires measured and cut to length are laid as desired, with each electric wire guide rod in the guide extended position in which it projects upwardly relative to the support tube mounted and fixed on the plate member.

For attachment mounting operation such as tape winding, the electric wire guide rod corresponding to the operating position is changed into the guide retracted position. By changing the electric wire guide rod into the guide retracted position, the electric wire guide portion is retracted to the level lower than the height of the bundle of electric wires being laid. Further, by laying down the upper portion of the electric wire guide rod including the electric wire guide portion with respect to the horizontal axis, a wide spacing is insured between the laid bundle of electric wires and the laid electric wire guide rod, and the attachment mounting operation such as tape winding is performed without obstacles, which increases working efficiency.

Preferably, the guide jig further comprises a spring element for urging the upper guide rod to rotate the upper guide rod on the second horizontal axis of the electric wire guide rod.

In the guide jig which further comprises the spring element for urging the upper portion of the electric wire guide rod including the electric wire guide portion for rotation thereof on the second horizontal axis, the reclining direction of the upper portion of the electric wire guide rod is restricted by the urging force of the spring element. Thus the respective electric wire guide rods of the guide jigs arranged densely can be laid down in the desired direction without interfering with each other. This also increases working efficiency.

Preferably, the upper guide rod includes an overhanging portion overhanging toward one side so that the center of gravity of the upper guide rod is eccentric toward the one side with respect to the vertical plane containing the second horizontal axis of the electric wire guide rod.

In the guide jig wherein the center of gravity of the upper portion of the electric wire guide rod including the electric wire guide portion is eccentric toward one side with respect to the vertical plane containing the second horizontal axis, the reclining direction of the upper portion of the electric wire guide rod is restricted by the gravity acting on the upper portion. Thus the respective electric wire guide rods of the guide jigs arranged densely can be laid down in the desired direction without interfering with each other. This also increases working efficiency.

It is an object of the present invention to provide a guide jig for a wiring harness assembly plate which provides increased working efficiency in wiring harness assembling operation.

These and other objects, features, aspects and advantages of the present invention will become more apparent from the following detailed description of the present invention when taken in conjunction with the accompanying drawings.

DESCRIPTION OF THE PREFERRED EMBODIMENTS

A first preferred embodiment according to the present invention will now be described with reference to the drawings. Referring to FIGS. 1 to 4, a guide jig 1 for a wiring harness assembly plate comprises a support tube 3 mounted and fixed in position on a plate member 2 on which wiring is suitably drawn, and an electric wire guide rod 4 supported by the support tube 3 for extension and retraction along the axis thereof.

The support tube 3 includes an upper holding tube **3*a* serving as an upper support tube, and a lower threaded tube 3*b* serving as a lower support tube and having a male threaded portion 3*f* on its outer peripheral surface. With the axes K of the holding tube 3*a* and the threaded tube 3*b* coinciding vertically, a pair of extending pieces 3*c* projecting from the bottom end of the holding tube 3*a* and a pair of extending pieces 3*d* projecting from the top end of the threaded tube 3*b* are connected to each other with a horizontal shaft 3*e*** for rotation on a horizontal axis L perpendicular to the vertical axes K.

Figure 1:
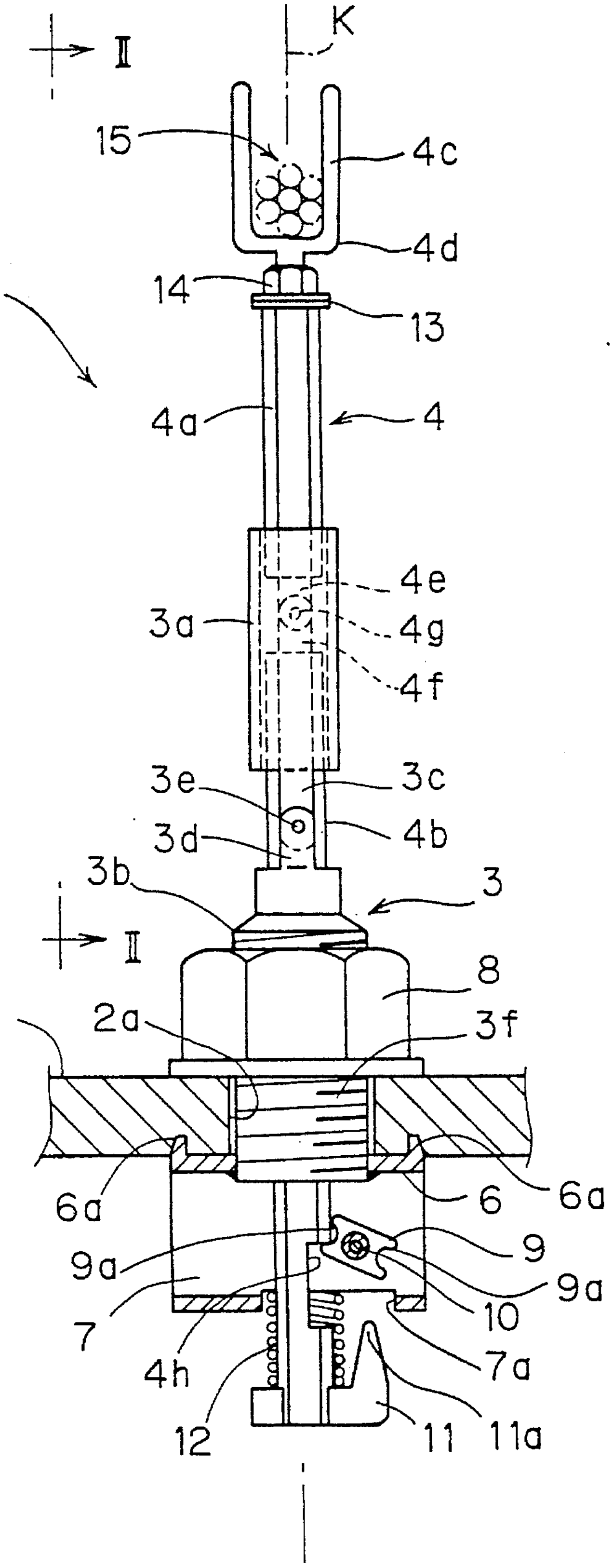
FIG. 1 is a front elevation of a first preferred embodiment according to the present invention.

A ring-like seat plate 6 is welded to the bottom end of the threaded tube **3*b*. A support plate 7 bent into a U-shaped configuration is welded to the lower surface of the seat plate 6. The seat plate 6 includes a partially cut and bent claw portion 6*a* at the outer periphery thereof. As shown in FIG. 1, a nut element 8 is tightened into threaded engagement with the male threaded portion 3*f*, with the holding tube 3*a* and the threaded tube 3*b* inserted from below into a through hole 2*a* formed in position in the plate member 2, and thus the claw portion 6*a* cuts into the plate member 2 to mount and fix the support tube 3 on the plate member 2. This provides restriction of rotation of the plate member 2 and the support tube 3 relative to each other. A generally H-shaped cam plate 9 serving as a locking element and having forked portions 9*a* on opposite sides is supported in the support plate 7 for rotation on a horizontal shaft 10**.

The electric wire guide rod 4 includes an upper guide rod **4*a*, a lower guide rod 4*b*, and a guide element 4*d* having a generally U-shaped electric wire guide portion 4*c*. The upper and lower guide rods 4*a* and 4*b* are of regularly hexagonal cross-sectional configuration, and each outer peripheral surface thereof defines an axially extending plane. With the axes K of the upper guide rod 4*a* and the lower guide rod 4*b* coinciding vertically, a pair of extending pieces 4*e* projecting from the bottom end of the upper guide rod 4*a* and a pair of extending pieces 4*f* projecting from the top end of the lower guide rod 4*b* are connected to each other with a horizontal shaft 4*g*** for rotation on a horizontal axis M perpendicular to the vertical axes K.

A locking groove **4*h* extending longitudinally of the lower guide rod 4*b* is formed in a lower portion of the lower guide rod 4*b*, and an L-shaped operating element 11 is fixed to the bottom end of the lower guide rod 4*b* by welding or with a machine screw. As shown in FIG. 1, the upper guide rod 4*a* and the lower guide rod 4*b* are inserted in the support tube 3 through an opening 7*a* formed at the bottom of the support plate 7, with a coil spring 12 fitted over the lower guide rod 4*b*. The male threaded shaft portion of the guide element 4*d* threadingly engages the top end portion of the upper guide rod 4*a*. A spacer 13 including an overhanging portion of a suitable thickness and a lock nut 14 are provided for regulation of the height and direction of the guide element 4*d* in the top end portion of the upper guide rod 4*a***.

Opposite side surfaces of the lower guide rod **4*b* are vertically slidable along opposite inner surfaces of the support plate 7, and the electric wire guide rod 4 is non-rotatably supported by the support plate 7. Thus, the support tube 3 and the electric wire guide rod 4** are incapable of rotating relative to each other on the vertical axes K.

Figure 2:
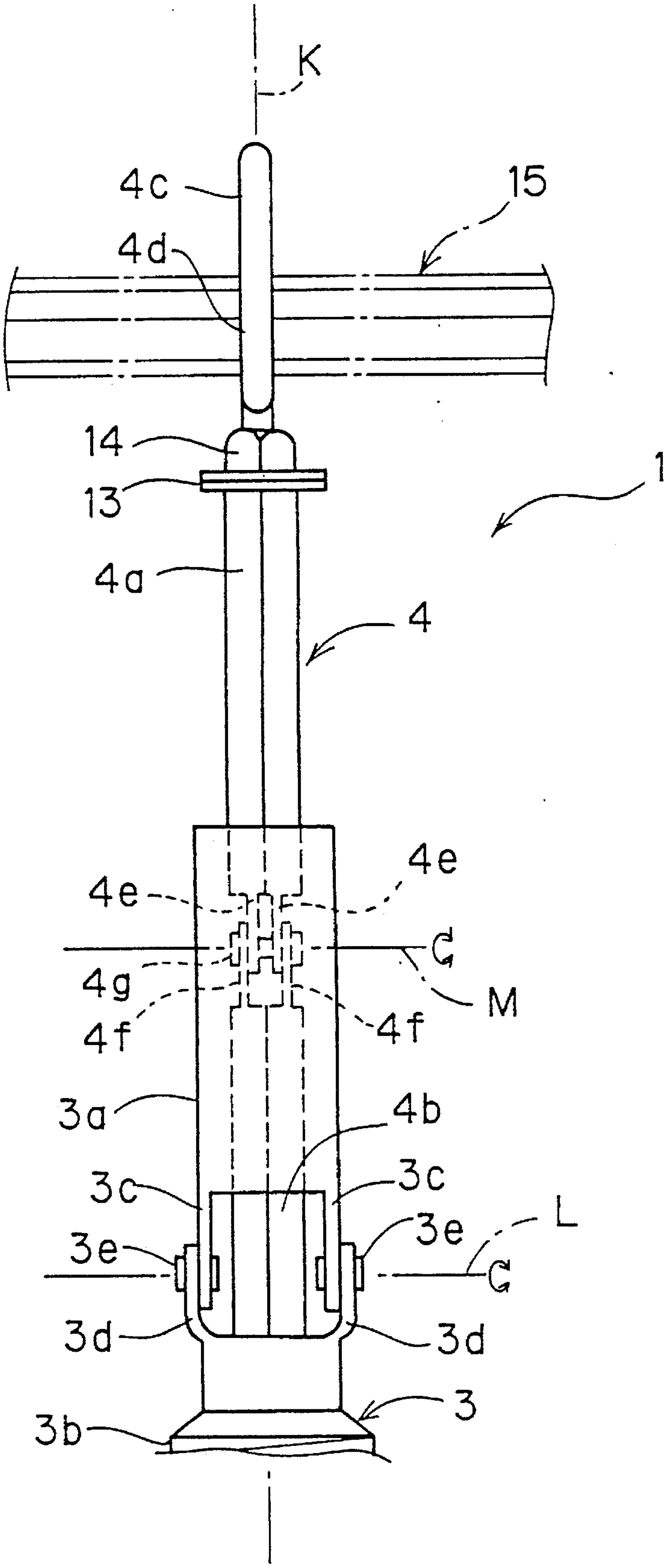
FIG. 2 is a view taken in the direction of the arrows II—II of FIG. 1.

As shown in FIGS. 1 and 2, the horizontal axis L of the support tube 3 and the horizontal axis M of the electric wire guide rod 4 are located in vertically parallel spaced relation. In a guide extended position in which the electric wire guide rod 4 projects upwardly so that the electric wire guide portion **4*c* guides and holds a bundle of electric wires 15, one of the forked portions 9*a* of the cam plate 9 is locked at the top end of the locking groove 4*h*, and the coil spring 12 is compressed between the operating element 11 and the peripheral portion of the opening 7*a*, the horizontal axis M of the electric wire guide rod 4 being at a vertically intermediate position within the holding tube 3*a***.

Figure 3:
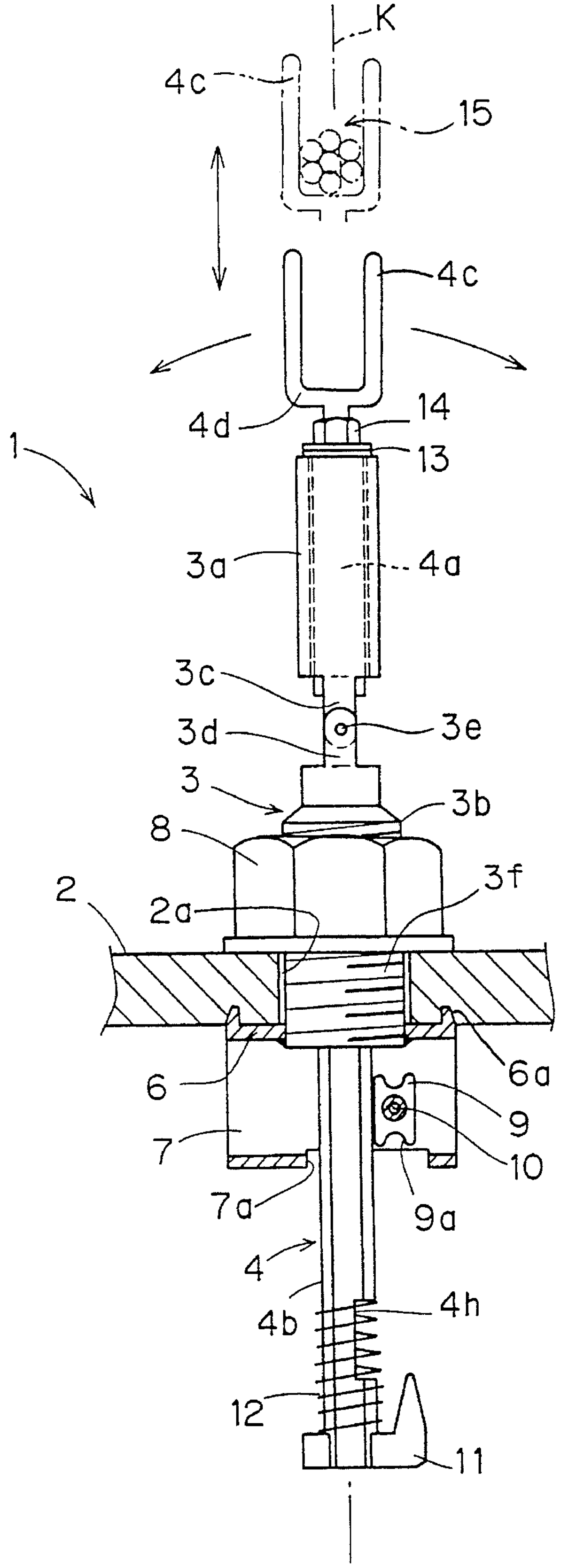
FIGS. 3 and 4 illustrate the operation of the first preferred embodiment.

As shown in FIG. 3, in a guide retracted position in which the electric wire guide rod 4 is retracted downwardly, the spacer 13 on the electric wire guide rod 4 abuts against the upper end surface of the holding tube **3*a*, and the downward movement of the electric wire guide rod 4 is then restricted. The electric wire guide portion 4*c* is retracted to a level lower than the height of the laid bundle of electric wires 15. The horizontal axis L of the support tube 3 and the horizontal axis M of the electric wire guide rod 4** are adapted to coincide with each other.

Figure 4:
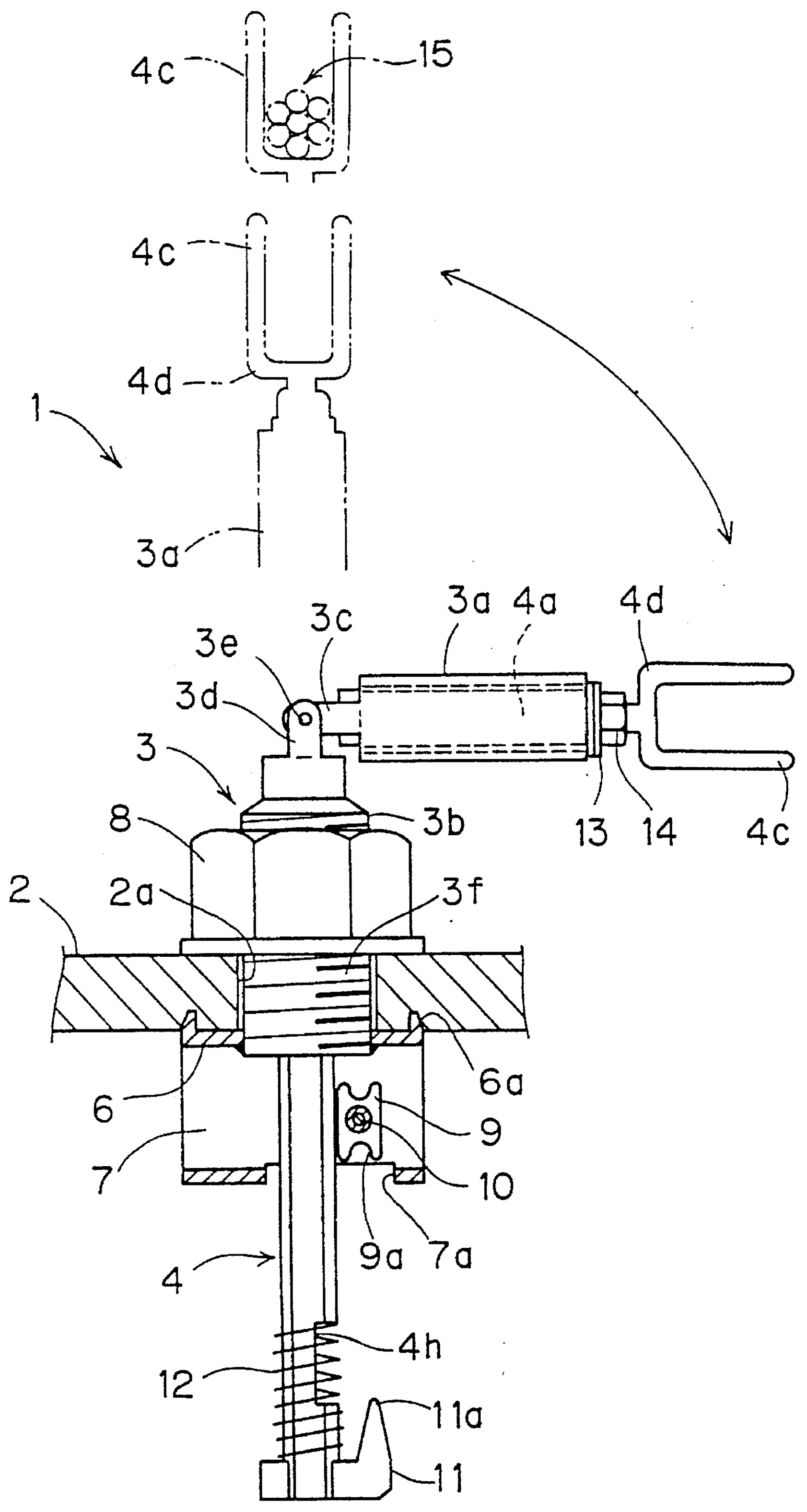

When the horizontal axes L and M coincide, the holding tube **3*a* and the upper guide rod 4*a* are rotatable on the horizontal shafts 3*e*, 4*g*, respectively, and the holding tube 3*a* and the upper guide rod 4*a* are reclinable with respect to the horizontal axes L and M, respectively. Referring to FIG. 4, the holding tube 3*a* and the upper guide rod 4*a*** are shown as laid down toward one side.

In the first preferred embodiment as above constructed according to the present invention, the holding tube **3*a* and upper guide rod 4*a* which are laid down as shown in FIG. 4 are raised as shown in phantom, and the guide element 4*d* are pulled upwardly. Then the coil spring 12 at its top end abuts against the peripheral portion of the opening 7*a* and is gradually compressed. Subsequently, a top end operating portion 11$a$ of the operating element 11 abuts against one of the forked portions 9$a$ of the cam plate 9 to rotate the cam plate 9** into an engaged position.

When the pull-up force is released, the accumulated elastic force of the coil spring 12 causes the electric wire guide rod 4 to slightly move downwardly into the guide extended position shown in FIG. 1. At this time, one of the forked portions 9$a$ of the cam plate 9 is locked at the top end of the locking groove 4$h$ of the lower guide rod 4$b$ to restrict the downward movement of the electric wire guide rod 4. As shown in FIG. 2, the lower guide rod 4$b$ is located at the position of the horizontal axis L of the support tube 3, and the horizontal axis M of the electric wire guide rod 4 is at a vertical intermediate position of the holding tube 3$a$. This provides restriction of the rotation of the holding tube 3$a$ on the horizontal axis L and the rotation of the upper guide rod 4$a$ on the horizontal axis M, and then the electric wire guide rod 4 is held in the guide extended position. In this state, the respective electric wires measured and cut to length may be laid as desired.

For the attachment mounting operation such as tape winding, slight pull up of the electric wire guide rod 4 allows the top end operating portion 11$a$ of the operating element 11 to rotate the cam plate 9 into a disengaged position to release the locking of one of the forked portions 9$a$ to the locking groove 4$h$. When the pull-up force is released, the electric wire guide rod 4 is moved downwardly by the accumulated elastic force of the coil spring 12 and by gravity to assume the guide retracted position in which the electric wire guide rod 4 is retracted to a level lower than the height of the laid bundle of electric wires 15, as shown in FIG. 3. In this state, the holding tube 3$a$ and the upper guide rod 4$a$ are reclinable with respect to the horizontal axes L and M of the horizontal shafts 3$e$ and 4$g$, respectively, and may be laid down in a desired direction as shown in FIG. 4.

As above described, after the electric wire guide rod 4 is once retracted downwardly, the upper guide rod 4$a$ provided on the upper side is laid down. This ensures a wide spacing between the laid bundle of electric wires 15 and the electric wire guide rod 4 in the reclined position of the holding tube 3$a$ and the upper guide rod 4$a$. The attachment mounting operation such as tape winding is carried out without obstacles without lifting the bundle of electric wires 15, which further increases working efficiency.

Figure 5:
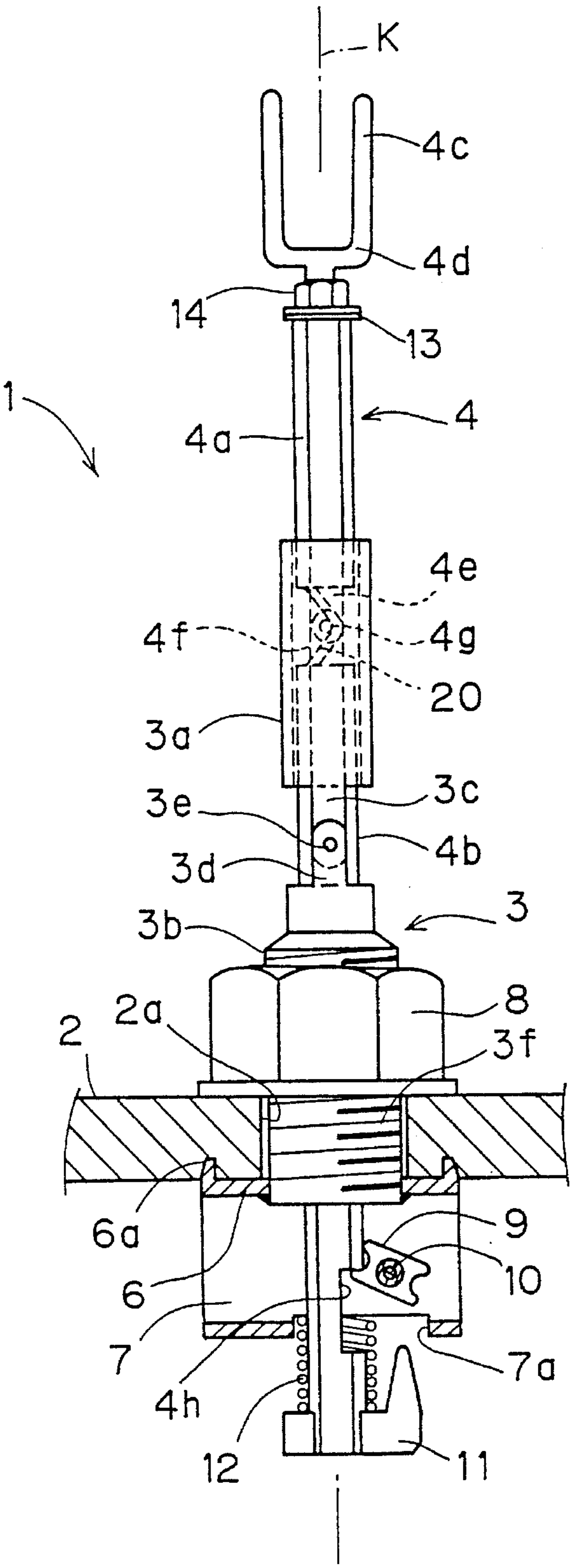
FIG. 5 is a front elevation of a second preferred embodiment according to the present invention.
Figure 6:
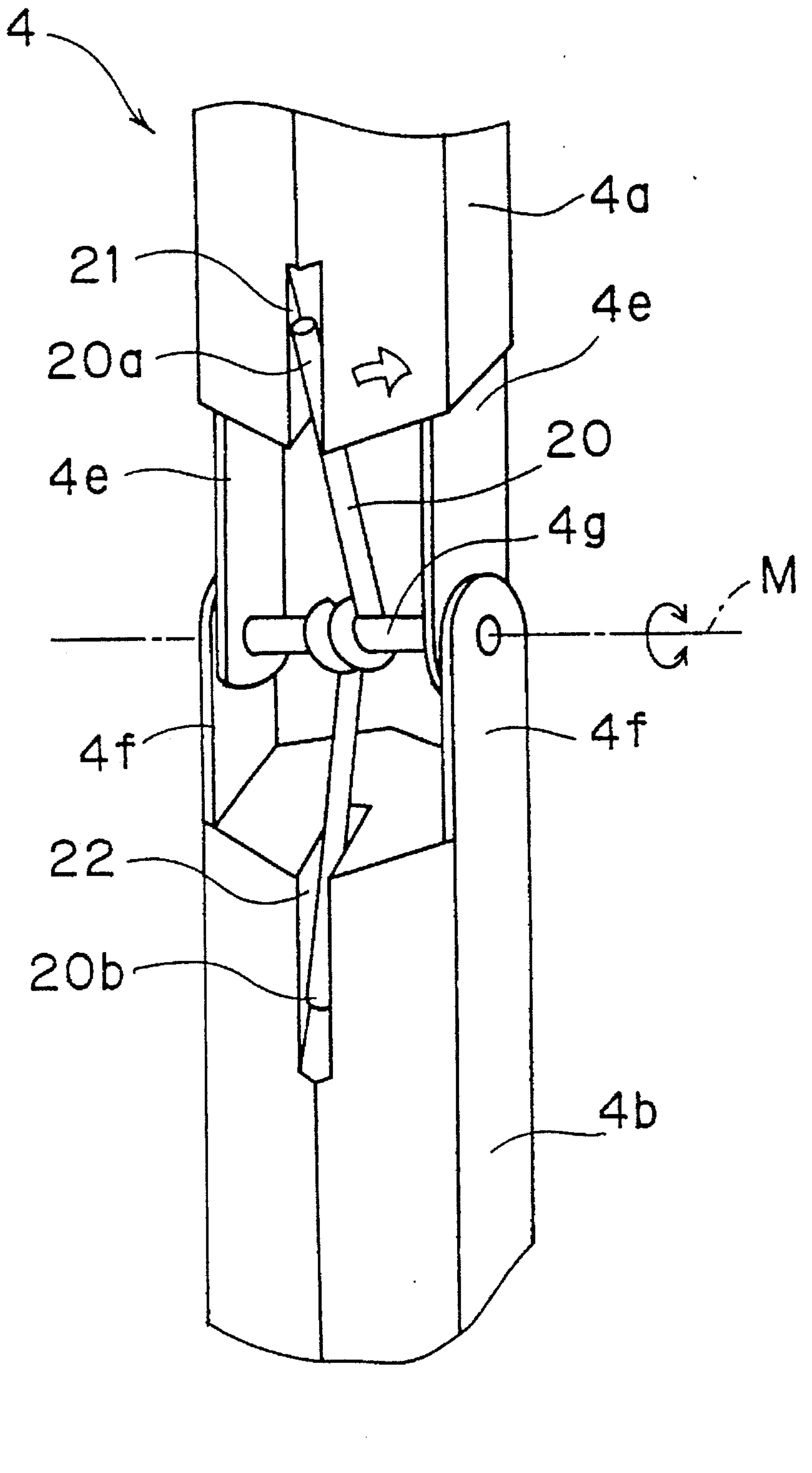
FIG. 6 is a perspective view of principal parts of FIG. 5.

FIGS. 5 and 6 illustrate a second preferred embodiment according to the present invention. A spring element 20 including a torsion spring is fitted over the horizontal shaft 4$g$ connecting the upper guide rod 4$a$ and the lower guide rod 4$b$. The spring element 20 has a first end 20$a$ locked in a groove portion 21 of the upper guide rod 4$a$ and a second end 20$b$ locked in a groove portion 22 of the lower guide rod 4$b$. The spring element 20 is mounted so that the upper guide rod 4$a$ and the lower guide rod 4$b$ are urged to rotate on the horizontal axis M of the horizontal shaft 4$g$.

In the second preferred embodiment, when the electric wire guide rod 4 assumes the guide retracted position, the upper guide rod 4$a$ having the electric wire guide portion 4$c$ of the electric wire guide rod 4 is urged to rotate on the horizontal axis M by the urging force of the spring element 20, and thus the holding tube 3$a$ and the upper guide rod 4$a$ are inclined in the urging direction of the spring element 20. This provides restriction of the reclining direction of the upper guide rod 4$a$ having the electric wire guide portion 4$c$. If the guide jigs 1 are arranged densely, the respective electric wire guide rods 4 of the guide jigs may be reclined in a desired direction without interfering with each other, which further increases working efficiency.

Figure 7:
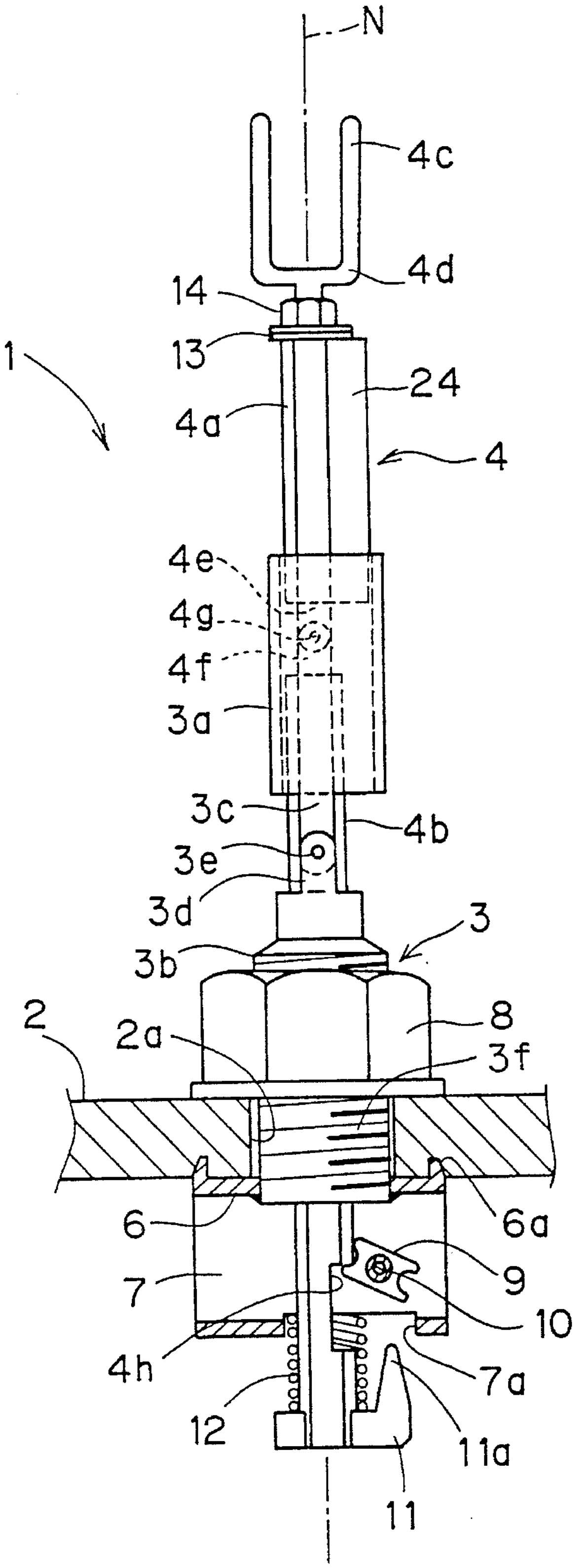
FIG. 7 is a front elevation of a third preferred embodiment according to the present invention.

FIG. 7 illustrates a third preferred embodiment according to the present invention. The upper guide rod 4$a$ includes an overhanging portion 24 overhanging toward one side such that the center of gravity of the upper guide rod 4$a$ is located eccentrically toward the one overhanging side with respect to the vertical plane N containing the horizontal axes L and M of the horizontal shafts 3$e$ and 4$g$. The holding tube 3$a$ is also shaped to overhang toward the one side in corresponding relation to the upper guide rod 4$a$, and the upper guide rod 4$a$ is movable along the interior of the holding tube 3$a$.

In the third preferred embodiment, when the electric wire guide rod 4 assumes the guide retracted position, since the center of gravity of the upper guide rod 4$a$ is located eccentrically toward the one side with respect to the vertical plane N containing the horizontal axes L and M, the gravitational force acting upon the upper guide rod 4$a$ causes the holding tube 3$a$ and the upper guide rod 4$a$ to be inclined toward the one side of the center of gravity. This provides restriction of the reclining direction of the upper guide rod 4$a$ having the electric wire guide portion 4$c$. If the guide jigs 1 are arranged densely, the respective electric wire guide rods 4 of the guide jigs may be reclined in a desired direction without interfering with each other, which further increases working efficiency.

In the above-mentioned preferred embodiments, the electric wire guide rod 4 has the regularly hexagonal cross-sectional configuration and the opposite side surfaces vertically slidable along the inner surface of the support plate 7 in order to restrict the rotation of the support tube 3 and the electric wire guide rod 4 relative to each other on the axes K. However, the restriction may be accomplished by the constructions shown in the publication and applications disclosed in the prior art and is not limited to the construction of the preferred embodiments. The position change of the electric wire guide rod 4 between the guide extended position and the guide retracted position may be accomplished by the constructions of the publication and applications disclosed in the prior art and other constructions, and is not limited to that of the preferred embodiments.

While the invention has been shown and described in detail, the foregoing description is in all aspects illustrative and not restrictive. It is therefore understood that numerous modifications and variations can be devised without departing from the scope of the invention.

What is claimed is:

1. A guide jig for a wiring harness assembly plate mounted and fixed on a plate member for guiding a bundle of electric wires, said guide jig comprising:

a support tube mounted and fixed on said plate member by a lower support tube, and an upper support tube connected to the top end of said lower support tube for rotation on a first horizontal axis;

an electric wire guide rod including an electric wire guide portion at its top end for guiding said bundle of electric wires, said electric wire guide rod being supported by said support tube for axial extension and retraction therethrough and being supported non-rotatably on a vertical axis by said support tube, said electric wire guide rod being operable to change the positions thereof between a guide extended position in which said electric wire guide rod projects upwardly so that said electric wire guide portion guides and holds said bundle of electric wires and a guide retracted position in which said electric wire guide portion is retracted to a level lower than the height of said bundle of electric wires being laid, said electric wire guide rod in said guide retracted position being supported by said support tube such that an upper portion of said electric wire guide rod including said electric wire guide portion is reclinable with respect to said first horizontal axis;

said electric wire guide rod including a lower guide rod supported by said lower support tube for extension and retraction along the axis of said lower support tube, and an upper guide rod connected to the top end of said lower guide rod for rotation on a second horizontal axis parallel to said first horizontal axis and supported by said upper support tube for extension and retraction along the axis of said upper support tube, wherein said second horizontal axis of said electric wire guide rod in said guide extended position is located within said upper support tube, and wherein said first horizontal axis of said support tube and said second horizontal axis of said electric wire guide rod coincide with each other in said guide retracted position.

2. The guide jig of claim 1, wherein said upper guide rod includes at its top end an overhanging portion abutting against an top end surface of said upper support tube for restricting the downward retraction of said electric wire guide rod.

3. The guide jig of claim 1, wherein said lower support tube includes a male threaded portion on its outer peripheral surface, a ring-like seat plate at its bottom end, and a nut element threadingly engaging said male threaded portion, and said nut element is tightened into threaded engagement with said male threaded portion of said lower support tube inserted into a through hole formed in said plate member to mount and fix said lower support tube on said plate member.

4. The guide jig of claim 2, wherein said lower support tube includes a male threaded portion on its outer peripheral surface, a ring-like seat plate at its bottom end, and a nut element threadingly engaging said male threaded portion, and said nut element is tightened into threaded engagement with said male threaded portion of said lower support tube inserted into a through hole formed in said plate member to mount and fix said lower support tube on said plate member.

5. The guide jig of claim 4, wherein said lower guide rod includes an axially extending planar portion on its outer peripheral surface, and said seat plate includes on its lower surface a support plate along which said planar portion of said lower guide rod is vertically slidable.

6. The guide jig of claim 5, wherein said lower guide rod includes a locking groove on its lower side surface, and said support plate includes a locking element releasably locked in said locking groove in said guide extended position of said electric wire guide rod.

7. The guide jig of claim 6, wherein said seat plate includes a cut and bent claw portion.

8. The guide jig of claim 6, wherein said lower guide rod includes an operating element at its bottom end for operating said locking element, and there is provided a coil spring fitted over said lower guide rod and positioned between said support plate and said operating element.

9. The guide jig of claim 1, further comprising a spring element for urging said upper guide rod to rotate said upper guide rod on said second horizontal axis of said electric wire guide rod.

10. The guide jig of claim 9, wherein said electric wire guide rod includes a pair of extending pieces projecting from the bottom end of said upper guide rod, a pair of extending pieces projecting from the top end of said lower guide rod, and a horizontal shaft for connecting said extending pieces for rotation on said second horizontal axis, and wherein said spring element is a torsion spring fitted over said horizontal shaft and having a first end locked in a groove portion formed at the bottom end of said upper guide rod and a second end locked in a groove portion formed at the top end of said lower guide rod.

11. The guide jig of claim 1, wherein said upper guide rod includes an overhanging portion overhanging toward one side so that the center of gravity of said upper guide rod is eccentric toward said one side with respect to the vertical plane containing said second horizontal axis of said electric wire guide rod.

* * * * *